(12) United States Patent
Lei (10) Patent No.: US 7,586,679 B2
(45) Date of Patent: Sep. 8, 2009

(54) IMAGE TRANSMISSION SYSTEM FROM THREE ROD LENSES FOR RIGID ENDOSCOPES

(75) Inventor: Fang Lei, Durchhausen (DE)

(73) Assignee: Karl Storz GmbH & Co. KG (DE)

( * ) Notice: Subject to any disclaimer, the term of this patent is extended or adjusted under 35 U.S.C. 154(b) by 837 days.

(21) Appl. No.: 10/764,908

(22) Filed: Jan. 26, 2004

(65) Prior Publication Data

US 2004/0252386 A1 Dec. 16, 2004

Related U.S. Application Data

(63) Continuation of application No. PCT/EP02/08035, filed on Jul. 19, 2002.

(30) Foreign Application Priority Data

Jul. 26, 2001 (DE) ............................... 101 36 117

(51) Int. Cl.
*G02B 23/24* (2006.01)
(52) U.S. Cl. ...................... 359/434; 359/435
(58) Field of Classification Search ......... 359/362–363, 359/434–435; 600/111–166; 128/4–6
See application file for complete search history.

(56) References Cited

U.S. PATENT DOCUMENTS

| | | | | |
|---|---|---|---|---|
| 4,784,118 A | * | 11/1988 | Fantone et al. | 600/160 |
| 4,970,546 A | * | 11/1990 | Suzuki et al. | 355/53 |
| 5,097,359 A | * | 3/1992 | McKinley | 359/435 |
| 5,142,410 A | * | 8/1992 | Ono et al. | 359/435 |
| 5,743,846 A | * | 4/1998 | Takahashi et al. | 600/166 |
| 5,933,275 A | * | 8/1999 | Igarashi | 359/435 |
| 6,088,157 A | * | 7/2000 | Mazurkewitz | 359/434 |

FOREIGN PATENT DOCUMENTS

| | | | | |
|---|---|---|---|---|
| JP | 61-20015 | * | 1/1986 | 359/435 |

* cited by examiner

*Primary Examiner*—Thong Nguyen
(74) *Attorney, Agent, or Firm*—St. Onge Steward Johnston & Reens LLC (57) ABSTRACT

The invention relates to an image transmission system for rigid endoscopes, having a central rod lens and two outer rod lenses, which are symmetrical in respect to one another in relation to a vertical central plane of the image transmission system relative to the optical axis, wherein all lens elements consist of optically homogenous material, all optically active surface are spherical and two lens elements are stuck to on another facing each other or facing away from one another on the opposite sided of the central and outer lenses in the main lens elements of the rod lenses so that the resulting composite lens is biconvex. According to the invention, the rod lenses are arranged apex to apex next to one another and the central rod lens is substantially as long as or longer than the outer rod lenses. The solution according to the invention provides an image that is as light as possible at a given transmission length, wherein the structure of the rod lens system is simple and imaging errors can be corrected as in prior art. The number of components and production complexity are low.

21 Claims, 7 Drawing Sheets

OBJECT          SCREEN SURFACE          PICTURE

FIG. 7

IMAGE TRANSMISSION SYSTEM FROM THREE ROD LENSES FOR RIGID ENDOSCOPES

CROSS-REFERENCE TO RELATED APPLICATIONS

This application is a continuation of pending International Patent Application No. PCT/EP02/08035 filed Jul. 19, 2002 which designates the United States and claims priority of pending German Application No. 10136117.3 filed Jul. 26, 2001.

FIELD OF THE INVENTION

The invention relates to a rod lens system as an image transmission system for rigid endoscopes and similar viewing tubes for transmitting a distal intermediate image into a proximal intermediate image.

BACKGROUND OF INVENTION

Endoscopes and the aforementioned viewing tubes, in addition to applications in medicine, are also used in technology for observations in hollow spaces such as bodily cavities, combustion chambers of engines, power systems, and the like. Depending on the depth of the cavity to be investigated, various transmission lengths need to be bridged by means of the rod lens system.

Therefore, image transmission systems called relay lens systems are also used, especially in rigid endoscopes as well as other viewing tubes such as technoscopes, periscopes, and the like. Endoscopes consist of an eyepiece portion, containing the eyepiece, as well as an oblong shaft in which additional optical components are contained. These additional optical components consist of the objective found at the front (distal) end of the endoscope and the image transmission or image relay lens system. The objective receives the scene to be observed and in an initial intermediate plane projects an intermediate image. This intermediate image is again configured by an image transmission or relay lens system and conveyed to the next intermediate image plane, from where an additional image transmission or relay lens system can assume the conveying task to the next intermediate image plane, until the image reaches the eyepiece.

The use of rod lenses to construct image transmission systems was proposed for the first time by Professor Hopkins in GB-PS 954 629. According to this fundamental proposal from Professor Hopkins, every image transmission system consists of two biconvex rod-shaped lenses and at least two additional meniscus lenses. Through the combination of rod-shaped biconvex lenses with meniscus lenses, it is possible, first, to achieve strong image brightness and, second, to compensate well for image errors such as astigmatisms and image field curvature, which can be a hindrance in image transmission systems.

As a result of the works of Professor Hopkins, a number of modified image transmission systems, which also used rod lenses, were developed and described.

An image transmission system of this kind is known, for instance, from EP 0 628 843. This known improved image transmission system consists in the embodiment in FIG. 6 of an internal and two outer rod lenses, where one convex lens and an additional concave lens element are cemented onto the outer rod lenses, on both sides in each case. The resulting lens structure is here convex-concave. The center lens is biconvex and of a single piece.

An additional image transmission system is seen in U.S. Pat. No. 5,805,345, in which a rod lens system is mentioned as state-of-the-art. In this system the center lens is configured either as a biconcave lens with biconvex lenses cemented on both sides or as a biconvex lens with meniscus elements cemented on both sides. In both cases the external rod lenses are identical and biconvex.

U.S. Pat. No. 4,168,882 presents a rod lens system with two rod lenses, affixed directly around the center plane, which are concave on the side turned inward and convex on the side turned outward, and two convex rod lenses affixed to them on the outside. The inner or outer rod lenses can be connecting lenses, and on the surfaces which the inner and outer rod lenses are turned toward, one meniscus element is cemented onto both the inner and the outer rod lenses. The connecting rod lens resulting from this is convex on the meniscus side, and the external rod lenses are in addition symmetrical to one another with respect to a symmetry plane of the image transmission system located perpendicular to the optical axis between the inner rod lenses.

In addition, in U.S. Pat. No. 5,805,345 a rod lens system consisting of two identical biconvex outer rod lenses and one smaller center connecting lens is described as the basic state-of-the-art for U.S. Pat. No. 5,805,345. In this case the connecting lens main element of the aforementioned center connecting lens is biconcave in one embodiment and has biconvex lens elements cemented to it, while according to an additional embodiment it is biconvex and has meniscus elements cemented to it.

In the construction of these embodiments, the outer rod lenses are set at a distance from the center connecting lens, possibly by means of distancing tubes, and, as previously mentioned, the center connecting lens is substantively shorter than both outer rod lenses.

These image transmission systems make possible a good correction of the astigmatism and image field curvature, but have the disadvantage that the transmitted proximal image is markedly darker than the distal starting image.

BRIEF SUMMARY OF THE INVENTION

The aim of the invention, therefore, is to produce the brightest possible image with the simplest possible construction of the rod lens system and with a correction of the imaging error that is comparable to the prevailing state-of-the-art for this product. At the same time, the number of components as well as the production cost should remain low.

In accordance to the invention, an image transmission system for rigid endoscopes has a center rod lens and two biconvex outer rod lenses, which are symmetrical to one another with respect to a center plane of the image transmission system that is perpendicular to the optical axis, and all lens elements consist of optically homogeneous material, all optically active surfaces are spherical, and two lens elements are cemented on both sides to the center rod lens, so that the resulting connecting lens is biconvex.

According to the invention, the aforementioned aim of the invention is met by virtue of the fact that the rod lenses are vertex-to-vertex adjacent to one another and the center rod lens is basically equally long as the outer rod lens, or longer.

According to the invention, an image transmission system for rigid endoscopes has a biconvex center rod lens and two outer rod lenses which are symmetrical to one another with respect to a center plane of the image transmission system that is perpendicular to the optical axis, and all lens elements consist of optically homogeneous material, all optically active surfaces are spherical, and the outer rod lenses are biconvex.

According to the invention, the aforementioned aim of the invention is met by virtue of the fact that one lens element is cemented to each of the outer rod lenses of the side turned inward, so that the resulting connecting lens is biconvex, the rod lenses are vertex-to-vertex adjacent to one another, and the center rod lens is essentially equally long as the outer rod lens, or longer.

By virtue of the characteristic whereby the rod lenses are directly (vertex-to-vertex) adjacent to one another, the invention can dispense with distancing tubes, which result in a cross-sectional reduction, that is, a reduction of the transparent surface.

The other characteristic of the invention, namely that the center rod lens is essentially equally long as the outer rod lens, or longer, marks an advance over the state-of-the-art in that an enlargement of the numeric aperture allows passage of a greater number of visual rays, and this, again, means an increase in image brightness. The center rod lens is thus lengthened in comparison to the state-of-the-art, making it, for instance, at least 90 percent of the length of the outer rod lens in order to achieve, if not an optimal image brightness, at least a brightness reduced by only a predetermined small amount since the numerical aperture is reduced only to a certain value corresponding to the preselected brightness.

In order to avoid a disturbing vignetting effect, the center rod lens can have an upper limit in length in proportion to the outer rod lens, for instance, at a value 1.5 times the length of the outer rod lens, corresponding to a preselected maximum vignetting.

The other characteristic from the specific portion of patent claim 2 [incomplete sentence: text missing?]

The first to thirteenth embodiments show advantageous versions of the invention.

DETAILED DESCRIPTION OF THE INVENTION

Figure 1:
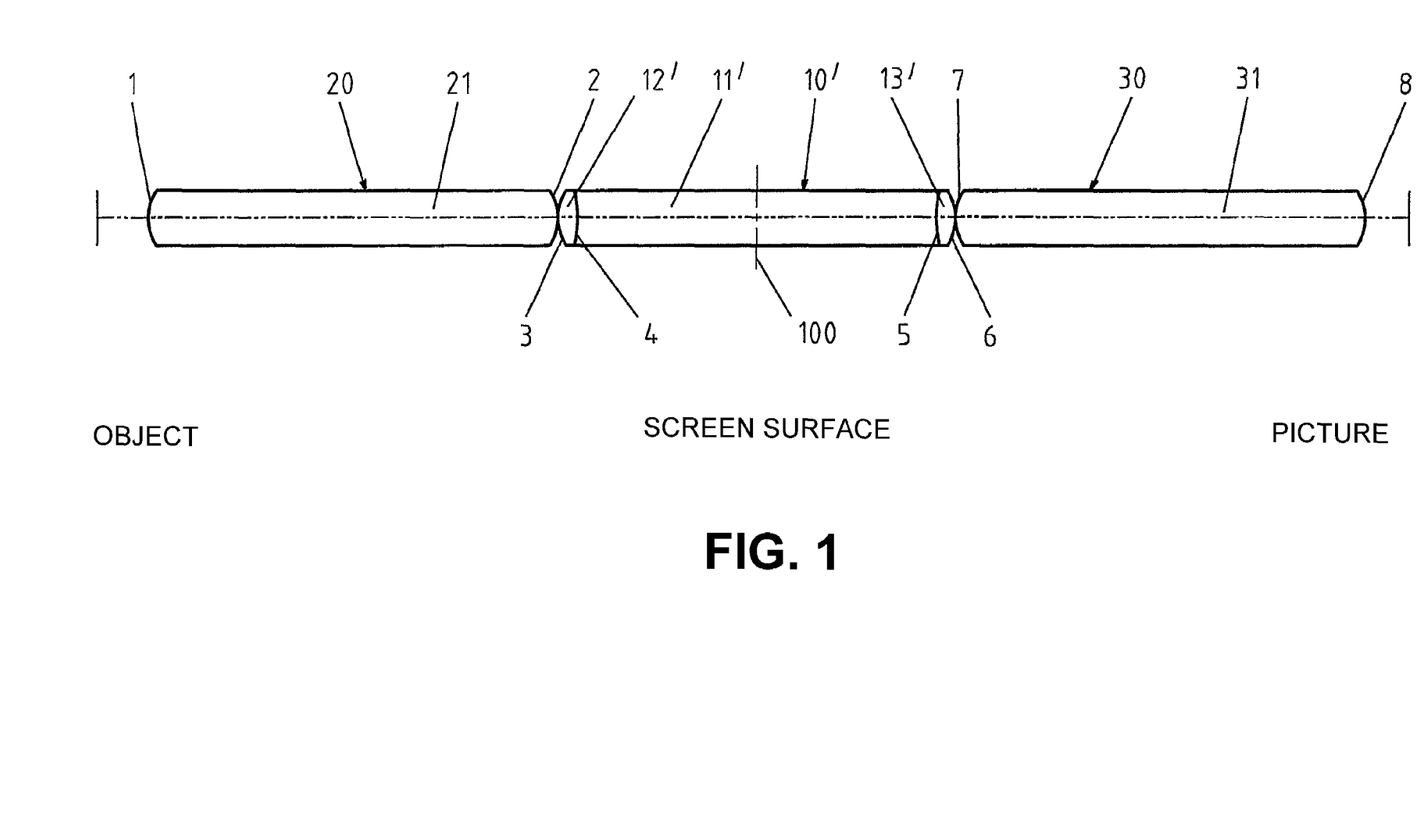
FIG. 1 is a side view of the present invention using a biconcave center rod lens with cemented biconvex lens elements and two biconvex outer rod lenses.

In the first embodiment as seen in FIG. 1, on a center biconcave rod lens main element (11'), which is symmetrical with respect to the center plane (100) that is perpendicular to the optical axis, biconvex lens elements (12', 13') are cemented to both sides, while the two outer rod lenses (20, 30) are uncemented, identical, biconvex, and arranged symmetrically with respect to the aforementioned center plane (100). In addition, the center rod lens (10') is longer than the two outer rod lenses (20, 30). These outer rod lenses are, according to the invention, vertex-to-vertex adjacent on the center connecting rod lens (10'). A distancing tube, to distance the individual lenses (10', 20, 30) on the radial outside of these lenses, is thus not provided. In this embodiment and those that follow, all lens elements are of an optically homogenous material and all optically active surfaces (1, 2, 3, 4, 5, 6, 7, 8) of all indicated rod lenses are spherical. This embodiment has the advantage that the two outer rod lenses (20, 30) can be manufactured as single pieces and identically, and the center rod lens main element (11') can be connected in a simple manner with the lens elements (12', 13') of the center lens (10') that are turned outward.

Embodiment 1 can, for instance, be produced according to the following table:

| Surface No. | Radius | Distance | Index of Refraction | Abbe Number |
| --- | --- | --- | --- | --- |
| Intermediate Image | Plane | 6.5 | Air | |
| 1 | 34.7 | 52.0 | 1.62 | 36.4 |
| 2 | −34.7 | 0 | Air | |
| 3 | 53.5 | 2.5 | 1.57 | 57.5 |
| 4 | −14.8 | 46.0 | 1.62 | 36.4 |
| 5 | 14.8 | 2.5 | 1.57 | 57.5 |
| 6 | −53.5 | 0 | Air | |
| 7 | 34.7 | 52.0 | 1.62 | 36.4 |
| 8 | −34.7 | 6.5 | Air | |
| Intermediate Image | Plane | 0 | Air | |

Figure 7:
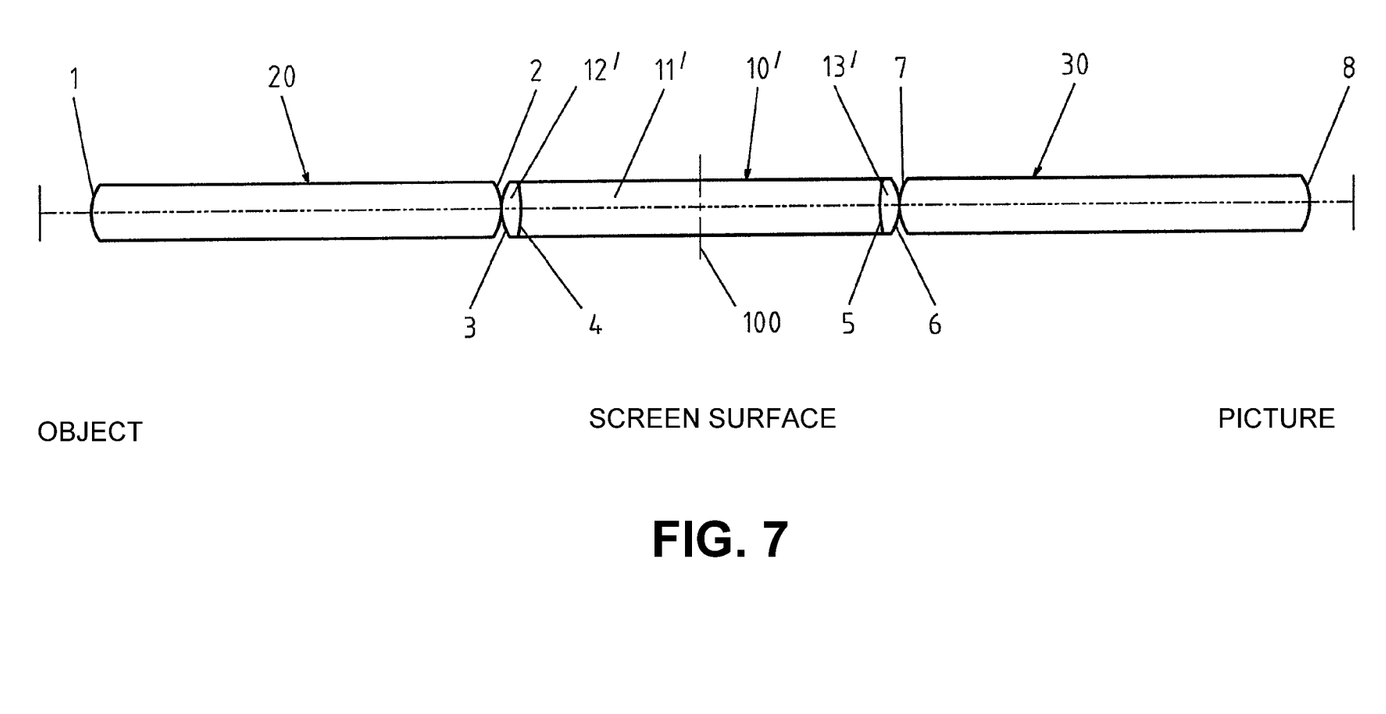
FIG. 7 is a side view of the present invention using a biconvex center rod lens with cemented meniscus lens elements and two biconvex outer rod lenses.

This embodiment can be modified as a second embodiment, as shown in FIG. 7, so that the center symmetrical rod lens main element is produced as biconvex element (11), and meniscus elements (12", 13"), rather than convex lens elements, can be cemented to it. The center rod lens main element in this case can advantageously be produced similarly or even identically to the outer lenses.

According to a third embodiment, with both aforementioned embodiments it is also possible to produce the center lens (10') to be approximately of the equal length as the outer lenses (20, 30), for instance 90 percent of their length, instead of with a greater length. This has the advantage that the vignetting is reduced, for instance by a preselected percentage, than when the center lens is longer than the outer lenses.

Figure 4:
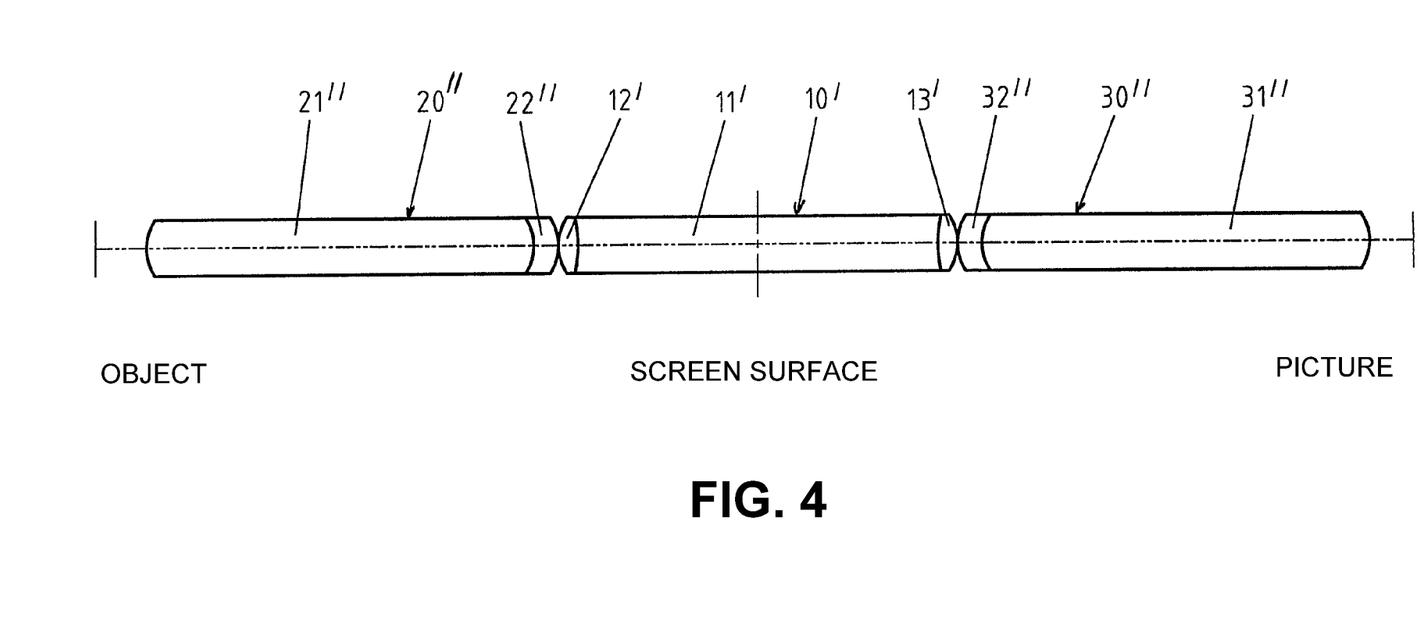
FIG. 4 is a side view of the present invention using a biconcave center rod lens with cemented biconvex lens elements and two biconvex outer rod lenses, each with a meniscus lens element cemented on the inner end.
Figure 5:
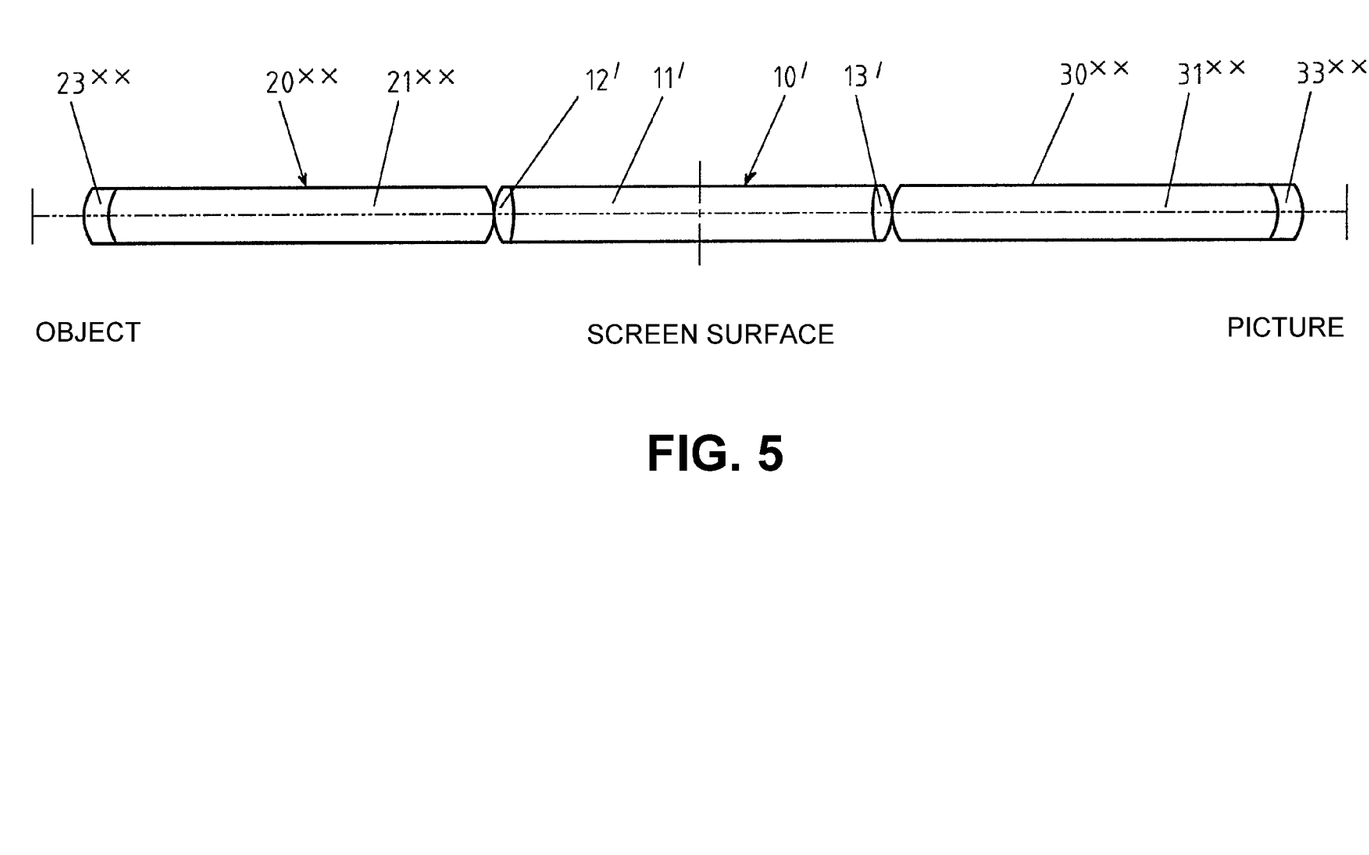
FIG. 5 is a side view of the present invention using a biconcave center rod lens with cemented biconvex lens elements and two biconvex outer rod lenses, each with a meniscus lens element cemented on the outer end.
Figure 6:
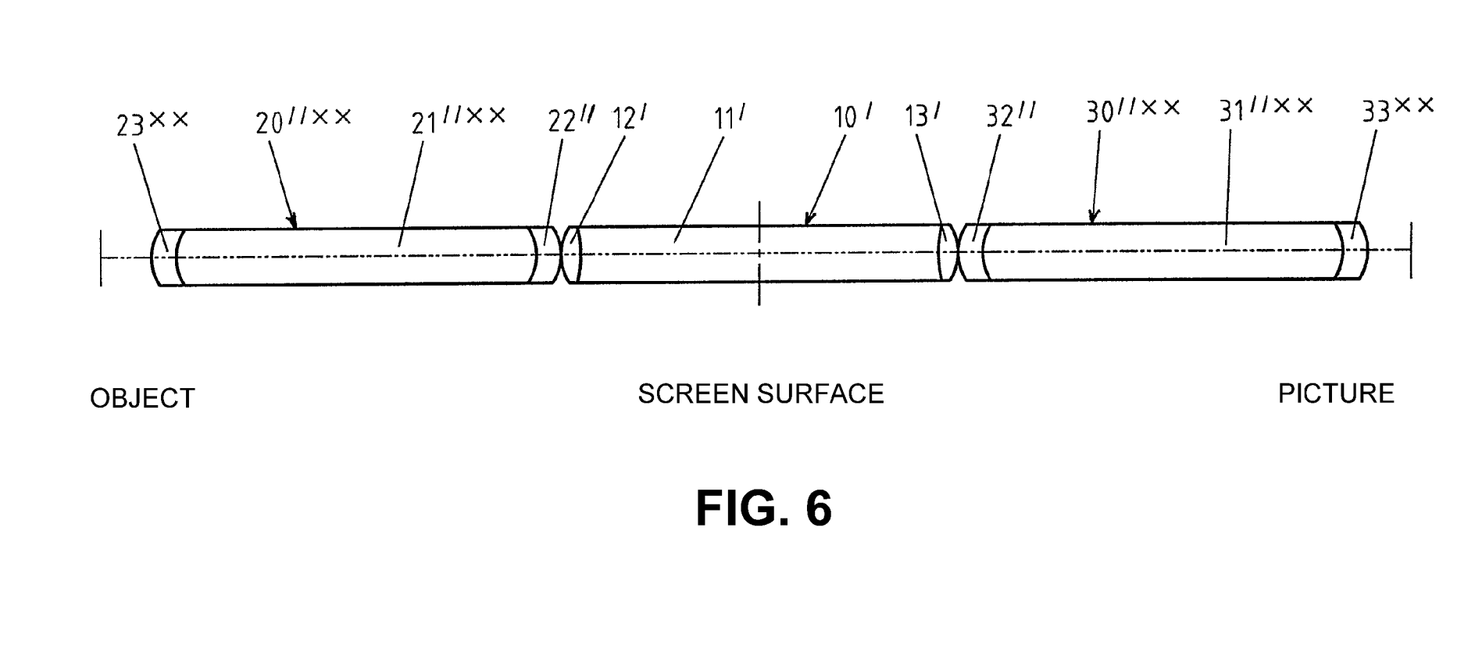
FIG. 6 is a side view of the present invention using a biconcave center rod lens with cemented biconvex lens elements and two biconvex outer rod lenses with meniscus lens elements cemented on both ends.

Other similar embodiments can be derived from the previous three embodiments as a fourth embodiment, illustrated in FIGS. 4, 5, and 6, in that the outer rod lenses (20", 30"; 20xx, 30xx; 20"xx, 30"xx), rather than as one piece, are constructed like the center one (10') as connecting rod lenses (20", 30"; 20xx, 30xx; 20"xx, 30"xx); that is, both outer rod lenses (20", 30"; 20xx, 30xx; 20"xx, 30"xx) are cemented on the side turned inward and/or on the side turned outward, symmetrical to one another with respect to a center plane (100) of the image transmission system with lens elements (22", 32", 23xx, 33xx). These lens elements (22", 32", 23xx, 33xx) can be positive or negative meniscus elements (22", 32", 23xx, 33xx), or biconvex lens elements, depending on whether the rod lens main element (21", 31"; 21xx, 31xx; 21"xx, 31"xx) of the outer rod lenses is biconvex, biconcave, or convex-concave. Through these modifications—at an increased manufacturing cost—it is possible to reduce the image curvature advantageously.

Figure 2:
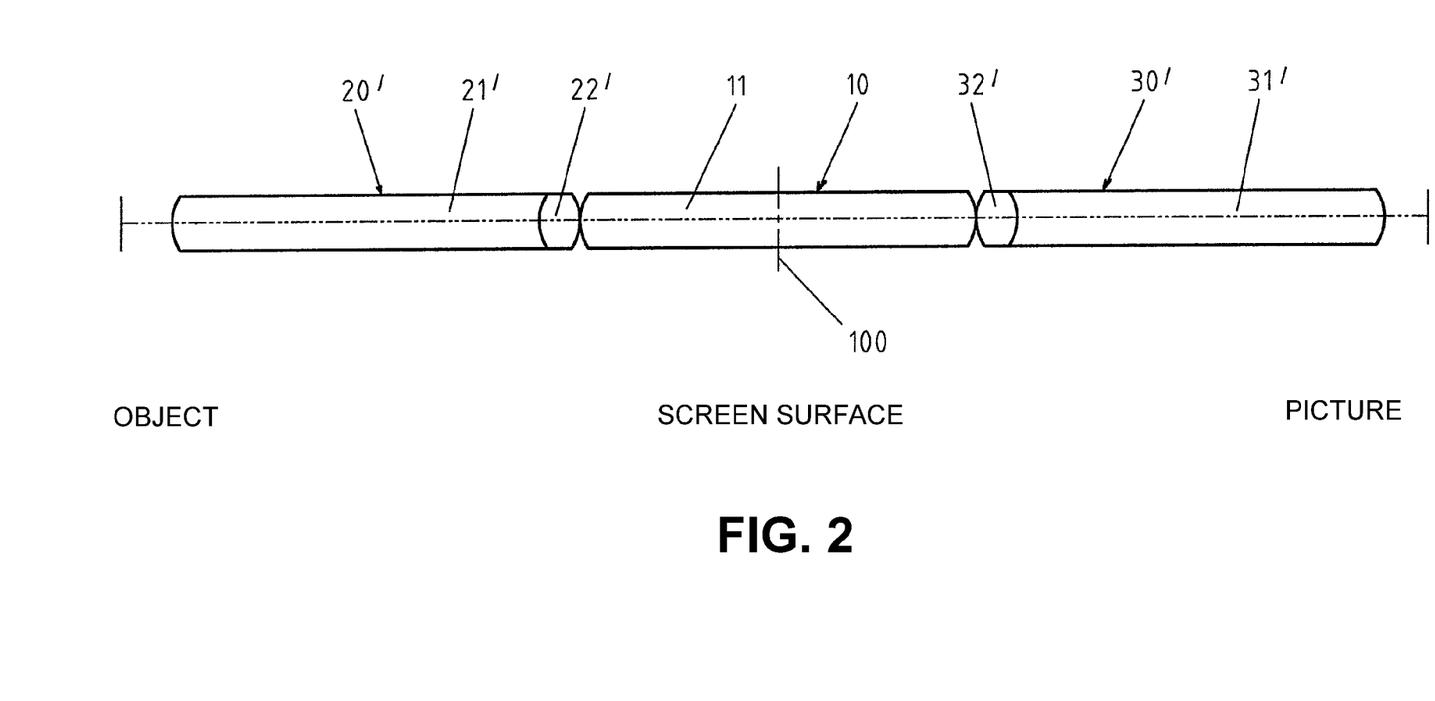
FIG. 2 is a side view of the present invention using a biconvex center rod lens and two outer rod lenses that are each convex at the outer end and concave on the inner end with a cemented biconvex lens element.
Figure 3:
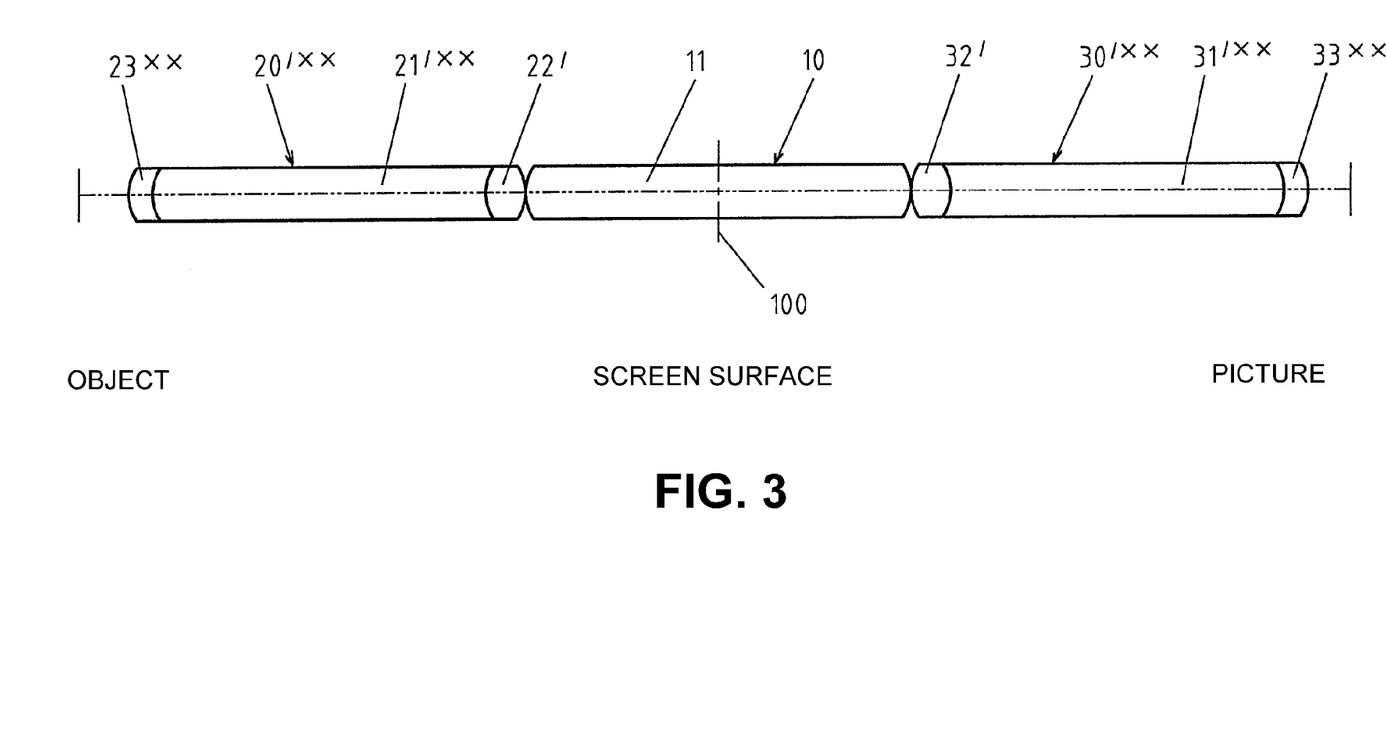
FIG. 3 is a side view of the present invention using a biconvex center rod lens and two outer rod lenses that are each convex at the outer end and concave on the inner end with a meniscus lens element cemented on the outer end and a biconvex lens cemented on the inner end.

According to a fifth embodiment, as shown in FIG. 2, the rod lens system, in addition to a center rod lens (10) that is symmetrical with respect to its center plane (100) that is perpendicular to the optical axis, includes two outer connecting rod lenses (20', 30'), which are symmetrical to one another with respect to the aforementioned center plane (100) and whose main elements (21', 31') are convex on the side turned outward and concave on the side turned inward. The center rod lens (10) here is biconvex and symmetrical but not cemented, and thus of one piece. As described above, it can be essentially of the same length as the outer rod lenses (20', 30') or somewhat longer, according to a preferred embodiment a maximum of 1.5 times as long as the outer rod lenses (20', 30'). On each of the two identical outer rod lens main elements (20', 30') one biconvex lens element (22', 32') is cemented on the side turned inward. Here too, as in all the following embodiments, the two outer connecting rod lenses (20', 30') are vertex-to-vertex adjacent on the center rod lens (10), making distancing holders superfluous. An advantage of this embodiment is that a lens element (22', 32') is cemented only on one side of the connecting rod main elements (21', 31'), which involves a simpler manufacturing process, especially concerning the mounting of the main element.

This embodiment can be modified to create a sixth embodiment, in that the outer rod lens main elements are produced as biconvex instead of convex-concave, and meniscus elements are cemented to them instead of convex lens elements. The center rod lens main element here can be produced as similar or even identical to the outer lenses. An advantage of this design is that the optically active surfaces of all rod lenses, that is of the two main elements of the outer rod lenses and the center rod lens, are convex and possibly identical; in other words, they can be produced together.

The following modifications are possible to the fifth and sixth embodiments:

As a seventh embodiment, the center rod element (10'), as in FIG. 4, rather than being of one piece, can also be constructed as a connecting rod lens (10'), both as a biconvex rod lens main element with positive or negative meniscus elements cemented to both sides, and as a biconcave rod lens main element (10') with biconvex lenses (12', 13') cemented to both sides. In addition, as an eighth embodiment illustrated in FIG. 6, in embodiments five and six the outer rod lenses (20"xx, 30"xx), in addition to the lens elements (22", 32") cemented to them on the side turned inward, also have lens elements (23xx, 33xx) cemented on their side turned outward. These lens elements (23xx, 33x) of the outer rod lenses (20"xx, 30"xx), turned outward, can be biconvex if the side of the outer rod lens main elements turned outward is concave, or they can be concave on the side turned inward and convex on the side turned outward, that is as meniscus elements (23xx, 33xx), if the outer rod lens main elements (21"xx, 31"xx) have a convex curvature on their side that is turned outward. According to the invention, the outer rod lenses (20, 30; 20', 30'; 20'xx, 30'xx; 20", 30"; 20xx, 30xx; 20"xx, 30"xx) are always constructed in such a way that they are symmetrical to one another with respect to a center plane (100) of the image transmission system that is perpendicular to the optical axis. By means of the modifications of the seventh and eighth embodiments, the image curvature can be reduced advantageously.

Among the aforementioned embodiments, a ninth can result from making the lens main elements of the connecting lens or lenses, if they are biconvex or biconcave, symmetrical with respect to their center plane that is perpendicular to the optical axis. The advantage of this type of symmetrical configuration consists in a production process that can more easily be unified.

It is also possible, in a tenth embodiment (as shown in FIG. 1, 4, 5, or 6), that the center rod lens (10') in the previous embodiments, if it is configured as a connecting rod lens (10'), can include ends which are symmetrical with respect to a symmetry plane (100) running through the center rod lens (10') perpendicular to the optical axis. The ends of the lens elements (10') should advantageously be unified.

In an eleventh embodiment (as can be seen in FIG. 1, 2, 3, 4, 5, or 6) the lens elements (12', 13'; 22', 32'; 22', 23xx, 32', 33xx; 22", 12', 13', 32"; 23xx, 12', 13', 33xx; 23xx, 22", 12', 13', 32", 33xx) cemented to the main element can be symmetrical as a hole to one another, which is advantageous because of additional unification, even of all lens elements.

In the aforementioned embodiments with a center connecting lens (as can be seen in FIG. 1, 4, 5, or 6), according to a twelfth embodiment, this connecting lens (10') can be configured as a cylinder as a connection between the rod lens main element (11') and the lens elements (12', 13') cemented to it.

In a thirteenth embodiment (as in FIGS. 2 through 6), among the aforementioned embodiments with outer connecting rod lenses (20', 30', 20'xx, 30'xx; 20", 30"; 20xx, 30xx; 20"xx, 30"xx), these lenses are configures in cylindrical form (20', 30', 20'xx, 30'xx; 20", 30"; 20xx, 30xx; 20"xx, 30"xx).

Additional modifications are possible in that, instead of one lens element (12', 13'; 22', 32'; 22', 23xx, 32', 33xx; 22", 12', 13', 32"; 23xx, 12', 13', 33xx; 23xx, 22", 12', 13', 32", 33xx), a number of lens elements can be cemented onto certain ends of one or more connecting lens rod main elements. For instance, it is possible to add a thirteenth embodiment which corresponds to the first embodiment, except that in addition to the biconvex lens elements (12', 13') cemented to the lens main element (11') of the center rod lens (10') on the side turned outward, meniscus elements are also cemented to these biconvex lens elements on the side turned outward. The advantage here is that the image curvature can be reduced.

Supplementary to the illustrated and described embodiments, it is of course also possible at any time to insert optically inactive surfaces, especially plane surfaces, into the image transmission system without going beyond the framework of the invention. Thus the individual lenses can be constructed from still more elements than indicated in the aforementioned embodiments. In using lenses made of still more elements, data of any additional lens elements can be adapted in known manner by means of commercially available optical design programs.

What is claimed is:

1. Image transmission system for rigid endoscopes and similar viewing tubes with a center rod lens and two outer rod lenses, which are symmetrical to one another with respect to a center plane of the image transmission system that is perpendicular to the optical axis of the image transmission system, wherein all lens elements consist in each case of optically homogeneous material, all optically active surfaces are spherical, the center rod lens consists of a rod lens main element and lens elements cemented to it, resulting in a biconvex connecting rod lens, and the outer rod lenses are biconvex, wherein the rod lenses are vertex-to-vertex adjacent to one another and the center rod lens is essentially of the same length as, or longer than, the length of each of the outer rod lenses.

2. Image transmission system for rigid endoscopes and similar viewing tubes according to claim 1, wherein the outer rod lenses consist of rod lens main elements and lens elements cemented to them on the side turned inward, so that the result is biconvex connecting rod lenses.

3. Image transmission system for rigid endoscopes and similar viewing tubes according to claim 2, wherein the rod lens main elements are convex lenses on the side turned outward and are concave lenses on the side turned inward, and the elements cemented to them on the side turned inward are biconvex lenses.

4. Image transmission system for rigid endoscopes and similar viewing tubes according to claim 2, wherein the rod lens main elements of the outer rod lenses and the lens elements cemented to them configure the outer rod lenses as a cylinder.

5. Image transmission system for rigid endoscopes and similar viewing tubes according to claim 2, wherein the center rod lens is in one piece.

6. Image transmission system for rigid endoscopes and similar viewing tubes according to claim 2, wherein the center rod lens is a connecting rod lens, which has a rod lens main element to which lens elements are cemented to its side turned outward, so that the resulting connecting rod lens is biconvex.

7. Image transmission system for rigid endoscopes and similar viewing tubes according to claim 2, wherein one or more of the lens main elements can be equipped with a number of lens elements cemented to it on the side turned outward or cemented to one another.

8. Image transmission system for rigid endoscopes and similar viewing tubes according to claim 1, wherein the rod lens main element is a biconcave lens and the lens elements cemented to it are biconvex lenses.

9. Image transmission system for rigid endoscopes and similar viewing tubes according to claim 1, wherein the rod lens main element is a biconvex lens, and the lens elements cemented to it are meniscus elements.

10. Image transmission system for rigid endoscopes and similar viewing tubes according to claim 9, wherein the meniscus elements are positive meniscus elements.

11. Image transmission system for rigid endoscopes and similar viewing tubes according to claim 9, wherein the meniscus elements are negative meniscus elements.

12. Image transmission system for rigid endoscopes and similar viewing tubes according to claim 1, wherein the length of the center rod lens essentially corresponds to the length of each of the outer rod lenses.

13. Image transmission system for rigid endoscopes and similar viewing tubes according to claim 1, wherein the rod lens main element are symmetrical with respect to its center plane that is perpendicular to the optical axis.

14. Image transmission system for rigid endoscopes and similar viewing tubes according to claim 1, wherein the center rod lens includes ends that are symmetrical with respect to a symmetry plane that runs through the center rod lens perpendicular to the optical axis.

15. Image transmission system for rigid endoscopes and similar viewing tubes according to claim 1, wherein the center connecting rod lens is symmetric with respect to a symmetry plane running through the center rod lens perpendicular to the optical axis.

16. Image transmission system for rigid endoscopes and similar viewing tubes according to claim 1, wherein the lens elements cemented to the rod lens main element are symmetrical to one another with respect to a symmetry plane running through the center rod lens perpendicular to the optical axis.

17. Image transmission system for rigid endoscopes and similar viewing tubes according to claim 1, wherein the rod lens main element of the center rod lens and the lens elements cemented to it configure the center rod lens as a cylinder.

18. Image transmission system for rigid endoscopes and similar viewing tubes according to claim 1, wherein no distancing tubes are used between the rod lenses.

19. Image transmission system for rigid endoscopes and similar viewing tubes according to claim 1, wherein each of the outer rod lenses is of one piece.

20. Image transmission system for rigid endoscopes and similar viewing tubes according to claim 1, wherein the outer rod lenses are connecting rod lenses, which include rod lens main elements and have lens elements cemented to them on the side turned inward, so that the resulting connecting rod lenses are biconvex.

21. Image transmission system for rigid endoscopes and similar viewing tubes according to claim 20, wherein the outer rod lenses are connecting rod lenses, which include rod lens main elements and lens elements cemented to them on the side turned outward, so that the resulting connecting rod lenses are biconvex.

* * * * *